United States Patent
Kirk et al.

(10) Patent No.: US 10,360,727 B2
(45) Date of Patent: Jul. 23, 2019

(54) METHODS FOR STREAMING VISIBLE BLOCKS OF VOLUMETRIC VIDEO

(71) Applicant: Onmivor, Inc., Seattle, WA (US)

(72) Inventors: Adam G. Kirk, Mercer Island, WA (US); Oliver A. Whyte, Seattle, WA (US)

(73) Assignee: Omnivor, Inc., Seattle, WA (US)

( * ) Notice: Subject to any disclaimer, the term of this patent is extended or adjusted under 35 U.S.C. 154(b) by 0 days.

(21) Appl. No.: 16/262,860

(22) Filed: Jan. 30, 2019

(65) Prior Publication Data

US 2019/0166410 A1 May 30, 2019

Related U.S. Application Data

(63) Continuation-in-part of application No. 16/049,764, filed on Jul. 30, 2018, now Pat. No. 10,229,537.

(60) Provisional application No. 62/540,111, filed on Aug. 2, 2017.

(51) Int. Cl.
*G06T 7/50* (2017.01)
*G06T 17/30* (2006.01)
*G06T 11/00* (2006.01)

(52) U.S. Cl.
CPC .......... *G06T 17/30* (2013.01); *G06T 7/50* (2017.01); *G06T 11/001* (2013.01); *G06T 2207/20172* (2013.01); *G06T 2210/12* (2013.01)

(58) Field of Classification Search
None
See application file for complete search history.

(56) References Cited

U.S. PATENT DOCUMENTS

| 8,023,726 | B2 * | 9/2011 | Sundaresan | G06K 9/00342 345/604 |
| 8,214,371 | B1 * | 7/2012 | Ramesh | G06F 16/29 707/743 |
| 2013/0297466 | A1 * | 11/2013 | Rossato | H04N 21/234327 705/30 |

\* cited by examiner

*Primary Examiner* — Said Broome
(74) *Attorney, Agent, or Firm* — Law Office of Mark A. Thomas

(57) ABSTRACT

A processor-implemented method for streaming visible blocks of volumetric video to a client device during a predefined time period is provided. The method includes (i) receiving at least one block description file from a content server, (ii) processing each block description in the at least one block description file, to determine the visible blocks that are selected from a set of blocks, that are capable of being visible to a viewer of the client device during the predefined time period, based on a 3D position, size, and an orientation of each block in the set of blocks and at least one view parameter of a user of the client device, (iii) transmitting a request for the visible blocks, to the content server, and (iv) receiving the visible blocks as a visible blocks video at the client device.

24 Claims, 9 Drawing Sheets

BLOCK DESCRIPTION FILE 200

| BLOCK DESCRIPTION 302A | | | | BLOCK DESCRIPTION 302L | | | RESOLUTION 304 | BITRATE 306 |
|---|---|---|---|---|---|---|---|---|
| 3D POSITION 308A | SIZE 310A | ORIENTATION 312A | | 3D POSITION 308L | SIZE 310L | ORIENTATION 312L | | |

FIG. 3

METHODS FOR STREAMING VISIBLE BLOCKS OF VOLUMETRIC VIDEO

CROSS-REFERENCE TO RELATED APPLICATIONS

This patent application claims priority to U.S. non-provisional patent application Ser. No. 16/049,764, filed on Jul. 30, 2018, and U.S. provisional patent application No. 62/540,111, filed on Aug. 2, 2017, the complete disclosures of which, in their entireties, are hereby incorporated by reference.

BACKGROUND

Technical Field

Embodiments of this disclosure generally relate to volumetric video streaming, and more particularly, to streaming a set of visible blocks of volumetric video from a content server to a client device during a predefined time period.

Description of the Related Art

Volumetric video, or free viewpoint video, captures a representation of surfaces in 3 dimensional (3D) space, and combines the visual quality of photography with the immersion and interactivity of 3D content. Volumetric video may be captured using multiple cameras to capture surfaces inside a defined volume by filming from multiple viewpoints and interpolating over space and time. Alternatively, volumetric video may be created from a synthetic 3D model. One of the features of volumetric video is the ability to view a scene from multiple angles and perspectives. Since the amount of data that has to be captured and streamed is huge as compared to non-volumetric video, encoding and compression plays a key role in broadcasting volumetric video.

Existing approaches for streaming volumetric video stream the entire scene independent of which surfaces are viewed by a user. One existing approach for streaming volumetric video is to send a mesh at the beginning of the video and a small number of deformation parameters over time. If the mesh needs to be modified (for example, a character taking off a jacket), a new mesh needs to be transmitted to the client. This causes an increase in required bandwidth, and many mesh modifications in a small time period can impact viewing performance. It is also reasonable to consider existing solutions for static meshes, and try to extend this to video. Another existing approach is to divide the surface into blocks that can be represented as texture and height fields, see the above referenced non-provisional patent application. One existing approach for static content is to transmit a mesh with texture. Static content can be downloaded progressively, starting with low resolution meshes and texture maps when a page loads, and downloading higher resolution meshes and textures on demand, however there is a delay when the user requests the higher resolution content, making this unsuitable for streaming video. Another existing approach for volumetric video is to render images that the user may see on demand and transmit images rather than surface data. This requires executing a full render pipeline on a server for each user viewing content.

In traditional adaptive bitrate streaming, the source media is encoded into multiple streams, each with a different bitrate. When viewing, the client requests a particular stream based on a conservative estimate of bitrate. If the bandwidth easily supports that stream, after a predefined length of time the client may request the next higher bitrate. The stream can be upgraded repeatedly until the client is receiving maximum quality. Traditional adaptive bitrate streaming doesn't support arbitrary viewpoint changes.

Volumetric video enables viewer control over what parts of a scene they view. A naive implementation of the volumetric video transmits all the data to a user or a viewer. The user may render the data from a virtual camera position in order to turn 3 dimensional (3D) data into an image. However, when all the data is transmitted, due to the vast amount of video content that has to be streamed, there may be network congestion resulting in significant delays in receiving the content at the client device, which adversely affects the viewing experience. Additionally, the content may be compressed to account for network performance, but existing solutions are transmitting surface data the viewer will not see (for example, the back of a character when the viewer is looking at the face). This means the visual quality of the surfaces the viewer does see has been compressed more than necessary to account for the surfaces the viewer doesn't see. Accordingly, there remains a need for a more efficient method for streaming volumetric video.

SUMMARY

In view of the foregoing, embodiments herein provide a processor-implemented method for streaming a set of blocks of volumetric video that correspond to a predefined time period from a content server. The method includes (i) receiving at least one block description file at a client device, (ii) processing each block description in the at least one block description file, at the client device, to determine the visible blocks selected from the set of blocks that are visible to a viewer of the client device within the predefined time period, (iii) transmitting a request for the visible blocks from the client device to the content server and (iv) receiving the visible blocks, at the client device. The method may include transmitting a request for at least one block description file, from the client device to the content server. The at least one block description file includes a set of block descriptions associated with the set of blocks for the predefined time period. The at least one block description file may include at least one resolution and at least one bitrate. For each block in the set of blocks, a block description for each block includes the 3D position, size, and the orientation of the block. A volumetric video can be represented as a set of blocks. The visible blocks are a subset of the set of blocks that are capable of being visible to a viewer of the client device within the predefined time period. The visible blocks are determined based on the 3D position and the orientation of each block in the set of blocks and at least one view parameter of a user of the client device. The selected visible blocks that are visible to the viewer of the client device may be transmitted based on a resolution and a bitrate that is requested by the client device.

In some embodiments, the request for the visible blocks includes a request for an encoded visible blocks video having a resolution that is within a predefined allowable deviation from a specified resolution that is specified by the client device.

In some embodiments, the visible blocks are determined based on at least one parameter that is selected from (i) a virtual camera position, (ii) a virtual camera orientation, (iii) a virtual camera field of view, or (iv) a rate of change of the virtual camera position, (v) the rate of change of the virtual camera orientation, and (vi) the rate of change of the virtual camera field of view of the client device.

In some embodiments, a first number (N) of subsets of the set of blocks of volumetric video is rendered into a first number (N) of visible blocks videos corresponding to a first number (N) of values of the at least one view parameter. In some embodiments, the first number (N) of values of the at least one view parameter are predefined by a content creator, and each of the first number (N) of visible bocks videos is rendered with respect to a different value of the at least one view parameter.

In some embodiments, each of the first number (N) of visible blocks videos is downsampled and re-encoded a second number (M) of times at the second number (M) of pairs of resolution and bitrates. The user may request a resolution and bitrate that are consistent based on network bandwidth and resolution of a rendered image.

In some embodiments, if the visible blocks videos are not available within a timeout period and if a superset of the visible blocks are available in a visible block video at the content server, the superset of the visible blocks is transmitted from the content server to the client device.

In some embodiments, the visible blocks videos are rendered and stored in the content server, and the visible blocks videos are available to be transmitted in response to a future request.

In some embodiments, the content server stores videos of different versions of each block selected from the set of blocks of volumetric video. In some embodiments, each version of each block corresponds to a different view orientation, and the content server determines a selected version of each block that provides a most accurate representation of each block from the view orientation of the viewer of the client device and transmits selected versions of each block from the set of visible blocks.

In some embodiments, if the volumetric video is generated using one or more cameras, the selected version of each block includes a texture that is obtained from a selected camera that is selected from the one or more cameras. In some embodiments, a camera that has a location and an orientation that corresponds most closely to the view location and an orientation of the viewer of the client device is selected as the selected camera.

In some embodiments, if the volumetric video is generated using a synthetic 3D model with simulated material properties, the selected version of each block that provides a most accurate representation of each block from the view orientation of the viewer of the client device is generated by rendering the synthetic 3D model from the view orientation of the viewer of the client device to obtain a resulting image, and a texture from the resulting image is used as a texture for each block.

In one aspect, a processor-implemented method for transmitting a set of blocks of volumetric video from a content server for streaming visible blocks videos at a client device during a predefined time period is provided. The method includes (i) processing at least one block description file, at the content server, (ii) determining the visible blocks based on a 3D position, size, and an orientation of each block in the set of blocks and at least one view parameter of a user of the client device, at the content server by processing each block description in the block description file and (iii) transmitting the visible blocks video to the client device. The at least one block description file includes a set of block descriptions associated with the set of blocks for the predefined time period. The at least one block description file may include at least one resolution and at least one bitrate. For each block in the set of blocks, a block description for each block includes a 3D position, size, and an orientation of each block. The visible blocks are a subset of the set of blocks, that are capable of being visible to the user during the predefined time period. The selected visible blocks that are visible to the viewer of the client device are transmitted as a video based on a resolution and a bitrate that is requested by the client device.

In some embodiments, the transmitted visible blocks video having a resolution that is within a predefined allowable deviation from a specified resolution that is specified by the client device.

In some embodiments, the method further includes the step of obtaining the orientation of each block in the set of blocks and the at least one view parameter of the user of the client device from the client device.

In some embodiments, the method further includes the steps of (a) obtaining, from the client device, the at least one parameter that is selected from (i) a virtual camera position, (ii) a virtual camera orientation, (iii) a virtual camera field of view, (iv) a rate of change of the virtual camera position, (v) the rate of change of the virtual camera orientation, and (vi) the rate of change of the virtual camera field of view of the client device and (b) determining the visible blocks, at the content server based on the at least one view parameter. In some embodiments, where the content server determines visible blocks based on the at least one view parameter, the client does not request or receive a block description file.

In some embodiments, a first number (N) of subsets of the set of blocks of volumetric video is rendered into a first number (N) of visible blocks videos corresponding to a first number (N) of values of the at least one view parameter. In some embodiments, the first number (N) of values of the at least one view parameter are predefined by a content creator, and each of the first number (N) of visible blocks videos is rendered with respect to a different value of the at least one view parameter.

In some embodiments, each of the first number (N) of visible blocks videos is downsampled and re-encoded a second number (M) of times at the second number (M) of pairs of resolution and bitrates. The user may request a resolution and bitrate that are consistent based on network bandwidth and resolution of a rendered image.

In some embodiments, if the visible blocks video is not available within a timeout period and if a superset of the visible blocks is available in a visible blocks video at the content server, the superset of the visible blocks is transmitted as a visible blocks video from the content server, to the client device.

In some embodiments, the method further includes the step of rendering and storing the visible blocks video in the content server. In some embodiments, the visible blocks video is available to be transmitted in response to a future request.

In some embodiments, the content server stores different versions of each block selected from the set of blocks of volumetric video. In some embodiments, each version of each block corresponds to a different view orientation, and the content server determines a selected version of each block that provides a most accurate representation of each block from the view orientation of the viewer of the client device and transmits selected versions of each block from the visible blocks.

In some embodiments, if the volumetric video is generated using one or more cameras, the selected version of each block includes a texture that is obtained from a selected camera that is selected from the one or more cameras. In some embodiments, a camera that has a location and an orientation that corresponds most closely to the view location and an orientation of the viewer of the client device is selected as the selected camera.

In some embodiments, if the volumetric video is generated using a synthetic 3D model with simulated material properties, the selected version of each block that provides a most accurate representation of each block from the view orientation of the viewer of the client device is generated by rendering the synthetic 3D model from the view orientation of the viewer of the client device to obtain a resulting image, and a texture from the resulting image is used as a texture for each block.

In another aspect, one or more non-transitory computer readable storage mediums storing one or more sequences of instructions, which when executed by one or more processors, causes a processor-implemented method for streaming a set of blocks of volumetric video that correspond to a predefined time period from a content server is provided. The method includes (i) receiving at least one block description file at a client device, (ii) processing each block description in the at least one block description file, at the client device, to determine the visible blocks selected from the set of blocks that are visible to a viewer of the client device within the predefined time period, (iii) transmitting a request for the visible blocks, from the client device to the content server and (iv) receiving the visible blocks in a visible blocks video, at the client device. The at least one block description file includes a set of block descriptions associated with the set of blocks for the predefined time. The at least one block description file includes at least one resolution and at least one bitrate. For each block in the set of blocks, a block description for each block includes the 3D position, size, and the orientation of the block. The visible blocks are a subset of the set of blocks, that are capable of being visible to a viewer of the client device within the predefined time period. The visible blocks are determined based on the 3D position, size, and the orientation of each block in the set of blocks and at least one view parameter of a user of the client device. The selected visible blocks that are visible to the viewer of the client device are transmitted based on a resolution and a bitrate that is requested by the client device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 illustrates a tabular view of a block description file that is transmitted from the content server to the client device of FIG. 1 according to some embodiments herein;

DETAILED DESCRIPTION OF PREFERRED EMBODIMENTS

Figure 1:
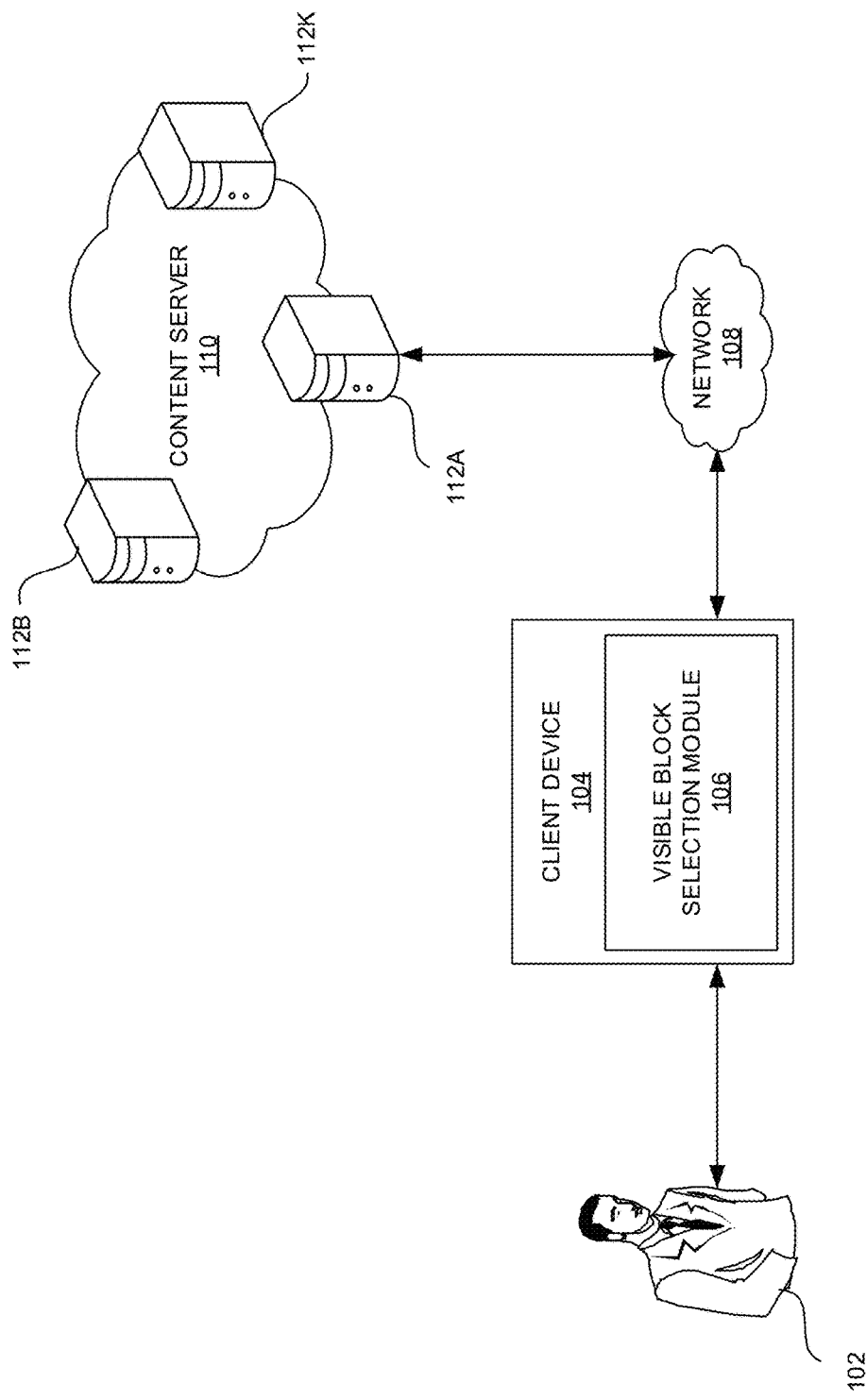
FIG. 1 is a block diagram of a content server streaming visible blocks videos to a client device through a network according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Referring now to the drawings, and more particularly to FIGS. 1 through 9, preferred embodiments are shown, where similar reference characters denote corresponding features consistently throughout the figures. In some embodiments, visible blocks videos are streamed from a content server to a client device during a predefined time period that is defined either by a content creator or that is learned programmatically (e.g. if the volumetric video format is block-based). In some embodiments, the block-based volumetric video format supports compression of time-varying surface data based on a surface representation. In some embodiments, the surface representation includes a 2 dimensional surface that is embedded in 3 dimensions as a height field and contained in an oriented bounding box. The surface representation may include a 2 dimensional surface that is parameterized in a rectangular grid. The surface representation may be stored in a block-based arrangement in 2 dimensional, where a block include a color and a height field component.

FIG. 1 is a block diagram of a content server 110 streaming visible blocks videos to the client device 104 according to some embodiments herein. The content server 110 may include one or more edge servers 112A-K, where K represents a whole number greater than 1. In some embodiments, the edge servers 112A-K are edge computing servers, e.g. Lambda@Edge by Amazon Web Services, Inc. of Seattle, Wash. In some embodiments, the edge servers 112A-K exist at a logical extreme or "edge" of a network and store content close to the client device 104 to help reduce latency and improve page load times. For convenience, the client device 104 is shown in FIG. 1 as single device, however, the client device 104 is not limited to a single client device and may actually represent a plurality of independent client devices. The client device 104, without limitation, may be selected from a mobile phone, a gaming device, a Personal Digital Assistant, a tablet, a desktop computer, or a laptop.

In some embodiments, the content server 110 is a Content Delivery Network (CDN), e.g. an Amazon CloudFront by Amazon Web Services, Inc. of Seattle, Wash., Cloudflare by Cloudflare, Inc. of San Francisco, Calif., or an Edgecast Content Delivery Network by Verizon Digital Media Services, Inc. of Santa Monica, Calif. The one or more servers 112A-K may communicate with one or more client devices through a network 108, e.g. the internet. In some embodiments, the network 108 is a wired network. In some embodiments, the network 108 is a wireless network. The client device 104 includes a visible block selection module 106. In some embodiments, the client device 104 transmits a first request for a block description file, via the network 108, to the content server 110. The content server 110 transmits the block description file to the client device 104 via the network 108. The block description file includes a set of block descriptions associated with a set of blocks for a predefined time period. In some embodiments, the predefined time period is 1 s, which may range from 0-1 s, 1-2 s, 2-3 s, etc. In some embodiments, the predefined time period is 2 s, which may range from 0-2 s, 2-4 s, 4-6 s, etc. In some embodiments, the content server 110 may transmit a plurality of block description files for more than one predefined time period, at a time, in response to a single request from the client device 104. The block description file may include a block description for each block in the set of blocks. In some embodiments, the block description file includes a list of resolutions and bitrates of each block. In some embodiments, the resolutions are 540p, 720p, 1080p, etc. In some embodiments, the bitrates are 1 Megabit per second (Mbps), 2 Megabits per second (Mbps), 3 Megabits per second (Mbps), etc.

In some embodiments the visible blocks videos are available at different resolutions and bitrates. The resolution and bitrate at which the visible blocks video will be streamed will be determined based on the request from the client device 104. The request from the client device 104 may specify a resolution and a bitrate, and if the same resolution and bitrate is available, the visible blocks video will be streamed at the same resolution and bitrate. Else, a resolution and a bitrate that is closest to the specified resolution and bitrate may be selected for streaming to the client device 104. The block description includes one or more parameters necessary to specify the block (a 3D position, size, and an orientation of the block). The block description may also include a full 3D description of a volume of the block in parameterized coordinates (e.g. a center, an orientation, and an axis length for a rectangle in 3D).

The visible block selection module 106 processes each block description in the block description file to determine the visible blocks selected from the set of blocks, that are capable of being visible to a viewer of the client device 104 during the predefined time period based on the 3D position, size, and the orientation of each block in the set of blocks and at least one view parameter of a viewer (e.g. the user 102) of the client device 104. In some embodiments, the visible blocks are determined based on the at least one view parameter that is selected from (i) a virtual camera position, (ii) a virtual camera orientation, (iii) a virtual camera field of view, (iv) a rate of change of the virtual camera position, (v) the rate of change of the virtual camera orientation, and (vi) the rate of change of the virtual camera field of view of the client device 104.

The client device 104 transmits a request for the visible blocks video at a specified resolution to the content server 110. In some embodiments, the request for the visible blocks video includes a request for a visible blocks video having a resolution that is within a predefined allowable deviation from a specified resolution that is specified by the client device 104. The content server 110 receives the request from the client device 104 and transmits the visible blocks video to the client device 104. In some embodiments, the transmitted visible blocks video having the resolution that is within the predefined allowable deviation from a specified resolution that is specified by the client device 104. The client device 104 may receive the visible blocks video within a predefined allowable deviation from the specified resolution. The visible blocks video contains a subset of blocks that are capable of being visible to the user 102 during the predefined time period and a desired resolution and bitrate. In some embodiments, the visible blocks are visible from a set of view parameters that are selected from a position, an orientation, a field of view, or a rate of change of the position, the orientation, the field of view, that are reachable within the predefined time period. A field of view at a given point in time may form a viewing frustum, and the viewing frustum may vary depending on the rate of change of one or more of the view parameters. In some embodiments, an overall set of view parameters may form a view space, and the set of view parameters that are reachable over the predefined time period may form a view subspace. In some embodiments, the visible blocks that are transmitted are blocks that intersect the view subspace. The blocks that intersect the view subspace may be referred to as view subspace blocks.

Figure 2:
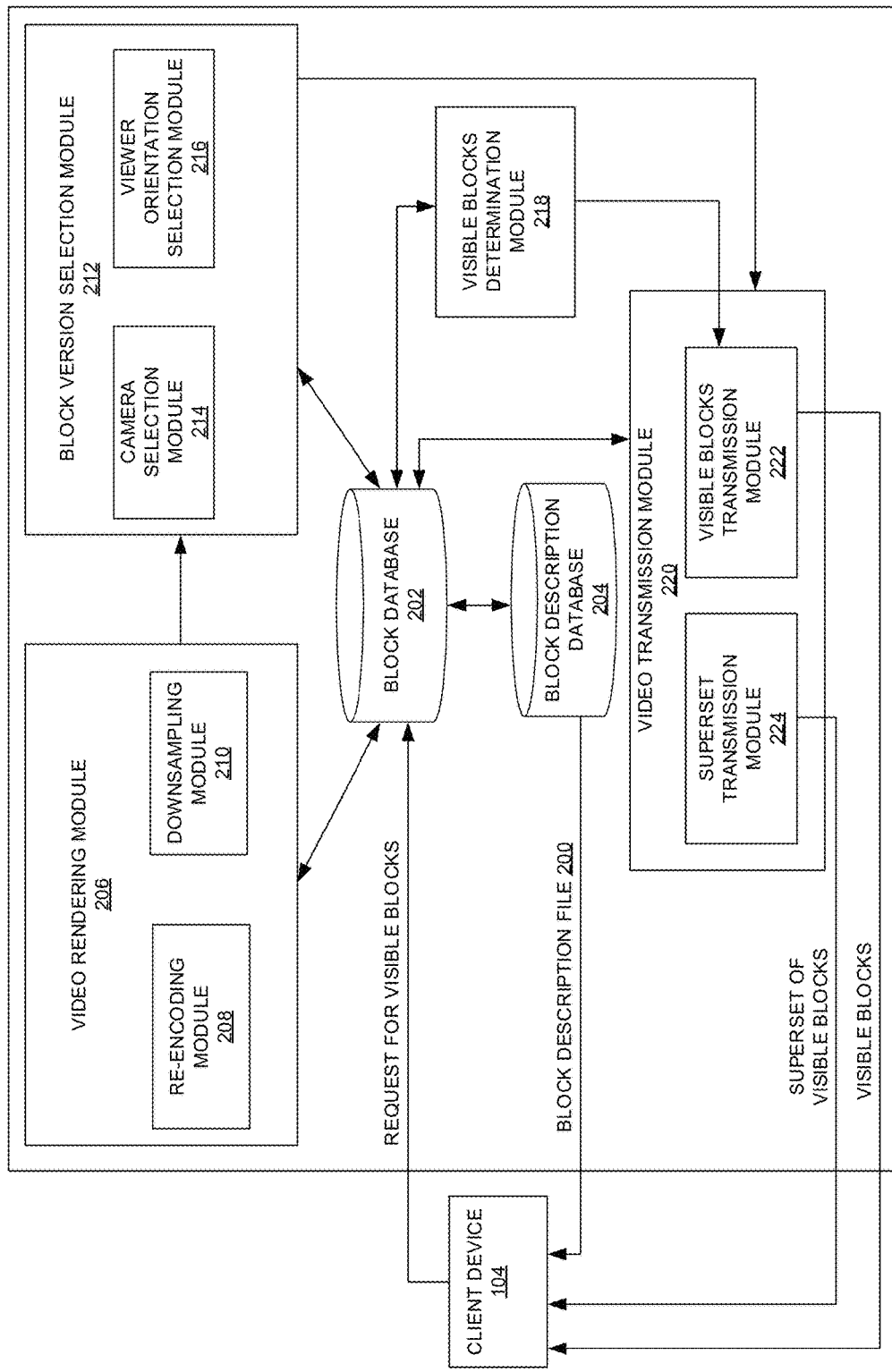
FIG. 2 is a block diagram of the content server of FIG. 1 according to some embodiments herein.

FIG. 2 is a block diagram of the content server 110 of FIG. 1 according to some embodiments herein. The content server 110 includes a block database 202, a block description database 204, a video rendering module 206, a block version selection module 212, visible blocks determination module 218, a video transmission module 220. The video rendering module 206 includes a re-encoding module 208 and a downsampling module 210. The block version selection module 212 includes a camera selection module 214 and a viewer orientation selection module 216. The video transmission module 220 includes visible blocks transmission module 222 and a superset transmission module 224. The block database 202 receives a first request for a block description file 200 from the client device 104 as shown in FIG. 1.

The block description database 204 stores the block description file 200 that includes a set of block descriptions associated with a set of blocks for a predefined time period. The block description file 200 may include a list of resolutions and bitrates for each block. The block description database 204 may store block descriptions for each block and block description files for each predefined time period. The block description database 204 transmits the block description file 200 to the client device 104. For each block in the set of blocks, a block description for each block includes a 3D position, size, and an orientation of each block. The video rendering module 206 renders a first number (N) of subsets of the set of blocks of volumetric video into N visible blocks videos corresponding to a first number (N) of values of the at least one view parameter, where N represents a number of subsets of the set of blocks.

In some embodiments, a content creator predefines the N values of the at least one view parameter, and each of the N visible blocks videos is rendered with respect to a different value of the at least one view parameter. The downsampling module 210 downsamples each of the N visible blocks videos a second number (M) of times. The re-encoding module 208 re-encodes the N visible blocks videos M times, where M represents a number of pairs of resolution and bitrates. In some embodiments, the video rendering module 206 renders the visible blocks video and stores the rendered visible blocks video in the block database 202. The user 102 may request a resolution and bitrate that are consistent based on network bandwidth and resolution of a rendered image.

The block database 202 stores different versions of each block selected from the set of blocks of volumetric video. In some embodiments, each version of each block corresponds to a different view orientation, and the block version selection module 212 determines a selected version of each block that provides a most accurate representation of each block from the view orientation of the viewer of the client device 104 and transmits selected versions of each block from the visible blocks.

If the volumetric video is generated using a synthetic 3D model with simulated material properties, the viewer orientation selection module 216 generates the selected version of each block that provides a most accurate representation of each block from the view orientation of the viewer of the client device 104 by rendering the synthetic 3D model from the view orientation of the viewer of the client device 104 to obtain a resulting image. A texture from the resulting image may be used as a texture for each block.

If the volumetric video is generated using one or more cameras, the camera selection module 214 selects a camera from the one or more cameras that has a location and an orientation that corresponds most closely to the view location and an orientation of the viewer of the client device 104 is selected as the selected camera. In some embodiments, the camera is a RGB camera. The selected version of each block includes a texture that is obtained from the selected camera. In some embodiments, the client device 104 may render the volumetric video at a lower resolution intentionally. For example, when the volumetric video has to be only rendered to a small area, the client device 104 may request low resolution data.

The visible blocks determination module 218 determines the visible blocks based on the 3D position, size, and the orientation of each block in the set of blocks and the view parameters of the user 102 of the client device 104, by processing each block description in the block description file 200. The visible blocks transmission module 222 transmits the visible blocks video at a resolution to the client device 104. In some embodiments, the visible blocks video is at a resolution that is equal to the specified resolution or within a predefined allowable deviation from the specified resolution. The selected visible blocks that are visible to the viewer of the client device 104 may be transmitted based on a resolution and a bitrate that is requested by the client device 104. If the visible blocks video is not available within a timeout period, the superset transmission module 224 transmits a superset of the visible blocks as a visible blocks video to the client device 104. In some embodiments, if the visible blocks video is not available within the timeout period, the visible blocks transmission module 222 transmits a visible blocks video including the requested blocks and a minimum number of unrequested blocks from the available visible blocks videos, known as the minimum superset visible blocks video to the client device 104. In some embodiments, the visible blocks video is rendered and stored in the block database 202 of the content server 110. The stored visible blocks videos are available to be transmitted in response to a future request. In some embodiments, the future request may be for the same set of visible blocks that was requested in a previous request. In some other embodiments, the future request may be for the visible blocks that were stored based on the previous request.

FIG. 3 illustrates a tabular view of the block description file 200 that is transmitted from the content server 110 to the client device 104 of FIG. 1 according to some embodiments herein. The block description file 200 includes a set of block descriptions 302A-L associated with a set of blocks for a predefined time period and resolution 304 and bitrate 306, where L is a number of block descriptions in the block description file 200. Each block includes a 3D position, size, and an orientation. The block description 302A includes a 3D position 308A, size 310A and an orientation 312A for a predefined time period. Similarly, the block description 302L includes a 3D position 308L, size 310L and an orientation 312L. In some embodiments, the block descriptions 302A-L may also include full 3D descriptions of volumes of the blocks in parameterized coordinates (e.g. a center, an orientation, and an axis length for a rectangle in 3D).

Figure 4:
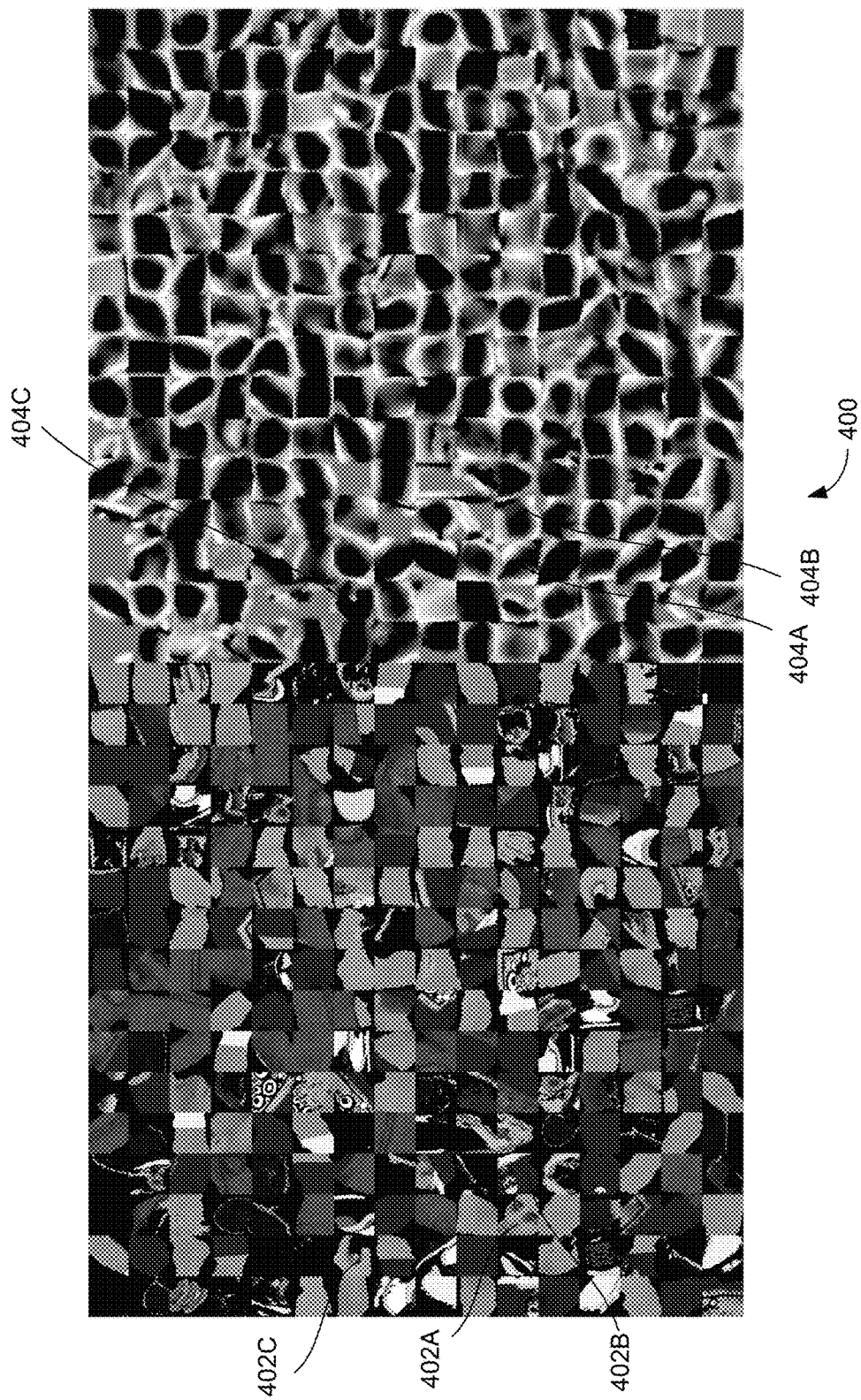
FIG. 4 is a screenshot of surface representations that are tiled in a color image and a grayscale image for a frame according to some embodiments herein.

FIG. 4 is a screenshot of surface representations that are tiled as blocks in a color image and a grayscale image for a frame 400 according to some embodiments herein. In some embodiments, this is a representation of a complete volumetric video. In some embodiments, a visible blocks video contains a subset of these blocks. The color image and the grayscale image are encoded at the same resolution in the screenshot. In some embodiments, a dynamic resolution of a block may approach zero bits, and the block may be streamed depending on a requested resolution, as well as one or more parameters such as face, hands, or a predetermined location based at least in part on the application, user choices, or other criteria. For example, selection of desired areas with higher resolution could be made by a content creator based on product placement, changes based on user's selection, etc.

The screenshot depicts a humanoid image decomposed into one or more blocks. The screenshot includes colored images of a surface representation of a face 402A, a surface representation of a part of a cap 402B and a surface representation of a hand 402C of an object (e.g. a skater) and grayscale images of a surface representation of a face 404A, a surface representation of a part of a cap 404B and a surface representation a hand 404C of an object of the one or more blocks of a volumetric video. The colored images of the surface representation of the face 402A, the surface representation of the part of the cap 402B and the surface representation the hand 402C match the grayscale images of the surface representation of the face 404A, the surface representation of the part of the cap 404B and the surface representation the hand 404C which represent the surface geometry. In some embodiments, a size of grids (e.g. 16×16 as shown in FIG. 4) is based on the requested resolution of the user 102. In some embodiments, a black square with white dots appears in a lower right corner of the texture data.

Figure 5:
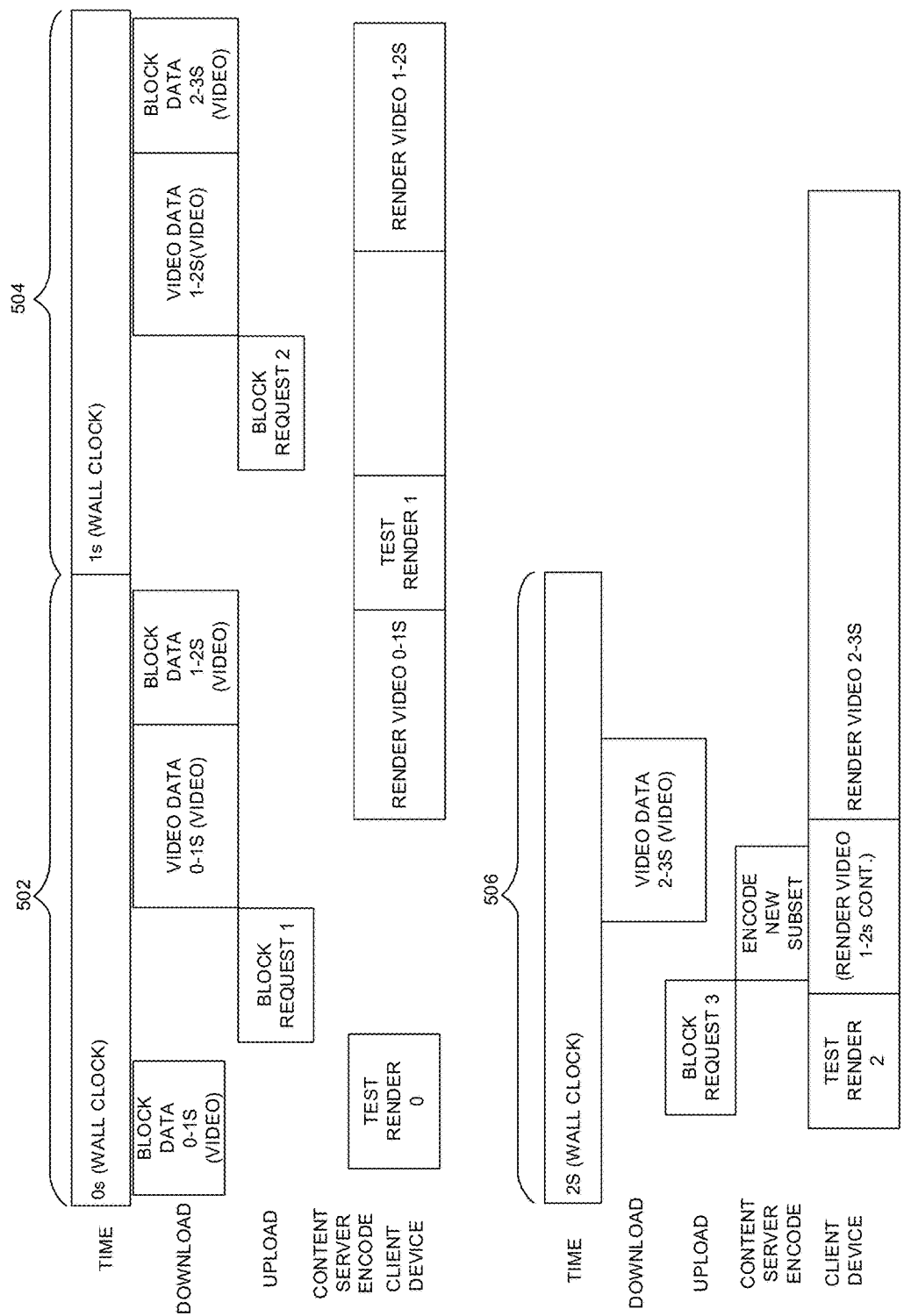
FIG. 5 illustrates a timeline of rendering sets of blocks over predefined time sequential periods, according to some embodiments herein.

FIG. 5 illustrates a timeline 500 of rendering sets of blocks over predefined time sequential periods, 502, 504, and 506 according to some embodiments herein. The client device 104 transmits a first request as shown in FIG. 1 (e.g. block request 1 as shown in FIG. 5) for a first block description file (e.g. block data 0-1 s as shown in FIG. 5) to the content server 110 as shown in FIG. 1. The client device 104 receives the block description file (e.g. the block description file 200 as shown in FIG. 2 and FIG. 3) from the content server 110. The block description file includes block descriptions of all blocks within a predefined time period. The block description file may include a list of resolutions and bitrates for each block or for a set of blocks. In the example shown in FIG. 5, the first predefined time period 502 is 0-1 s. Then client device 104 performs a first test render (e.g. test render 0 as shown in FIG. 5) to determine which blocks are available. In some embodiments, a test render is performed to evaluate each block to determine if it is or capable of being visible in the predefined time period. In some embodiments, if the block is capable of being visible in the predefined time period, it overlaps the view subspace and is retrieved, if it is not capable of being visible in the predefined time period, it does not overlap the view subspace and it is not retrieved. The visibility test is based on at least one view parameter that is selected from (i) a virtual camera position, (ii) a virtual camera orientation, (iii) a virtual camera field of view, (iv) a rate of change of the virtual camera position, (v) the rate of change of the virtual camera orientation, and (vi) the rate of change of the virtual camera field of view of the client device. The client device 104 then sends a first block request (e.g. block request 1 as shown in FIG. 5) for a set of blocks within a first predefined time period 502, and downloads a visible blocks video for the first predefined time period 502. In some embodiments, the visible blocks video is sent as a streaming file, so it starts rendering shortly after the video data download begins.

In some embodiments, immediately after downloading the visible blocks video for the first predefined time period 502, the client device 104 downloads a second block description file (e.g. block data 1-2 s as shown in FIG. 5) for a second predefined time period 504. In the example shown in FIG. 5, the second predefined time period 504 is 1-2 s. In some embodiments, halfway through rendering the video for 0-1 s, the client device 104 performs a second test render (e.g. test render 1 as shown in FIG. 5) to determine visible blocks from the second block description file for the second predefined time period 504 (e.g. 1-2 s). The client device 104 then sends a second block request (e.g. block request 2 as shown in FIG. 5) for a second set of blocks within the second predefined time period 504.

If the visible blocks video for the second predefined time period 504 is already available (e.g. as shown in the example of FIG. 5), the visible blocks video for the second predefined time period 504 downloads immediately. In some embodiments the entire visible blocks video for the second predefined time period 504 is downloaded before the first video finishes rendering. The client device 104 starts rendering the visible blocks video for the second predefined time period 504 immediately while downloading the third block description file (e.g. block data 2-3 s as shown in FIG. 5) for a third predefined time period 506. Halfway through rendering the visible blocks video for the second predefined time period 504, the client device 104 performs a third test render (e.g. test render 2 as shown in FIG. 5) to determine visible blocks from the third block description file for the third predefined time period 506 (e.g. 2-3s).

The client device 104 then sends a third block request (e.g. block request 3 as shown in FIG. 5) for a third set of blocks within the third predefined time period 506. However, since the content server 110 does not have the visible blocks that are requested already encoded into a visible blocks video, the content server 110 assembles and encodes the visible blocks into a visible blocks video and stores the file on the content server 110. The client device 104 begins downloading the visible blocks video for the third predefined time period 506 and renders the visible blocks video for the third predefined time period 506. In some embodiments, the request for the visible blocks includes a request for an encoded visible blocks video having a resolution that is within a predefined allowable deviation from a specified resolution that is specified by the client device. In some embodiments the video is encoded with standard video encoders, such as MPEG H.264.

Figure 6:
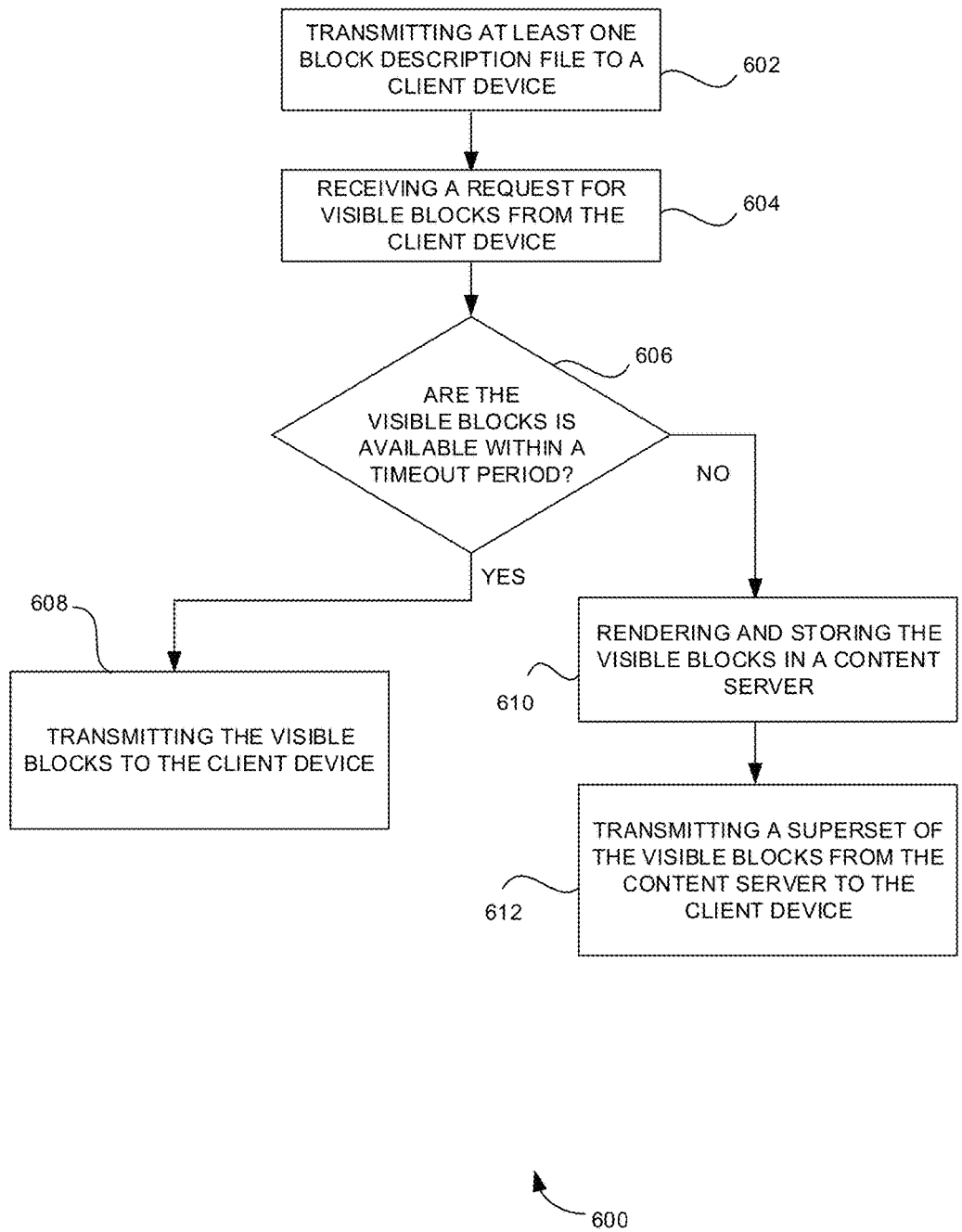
FIG. 6 is a flow chart that illustrates a method for transmitting visible blocks videos or a superset of the visible blocks as a visible blocks video from the content server to the client device of FIG. 1 according to some embodiments herein.

FIG. 6 is a flow chart that illustrates a method 600 for transmitting visible blocks videos or a superset of the visible blocks in a visible blocks video from the content server 110 to the client device 104 of FIG. 1 according to some embodiments herein. At step 602, at least one block description file is transmitted to the client device 104. At step 604, a request for the set of visible blocks, is received from the client device 104. At step 606, if the visible blocks video is available within a timeout period then at step 608, the visible blocks video is transmitted to the client device 104. In some embodiments, the request for the visible blocks video includes a request for a visible blocks video having a resolution that is within a predefined allowable deviation from a specified resolution that is specified by the client device 104. Else, if the visible blocks video is not available within the timeout period, at step 610, the visible blocks are rendered and stored as a visible blocks video in the content server 110. At step 612, the superset of the visible blocks are transmitted as a visible blocks video from the content server 110 to the client device 104.

Figure 7:
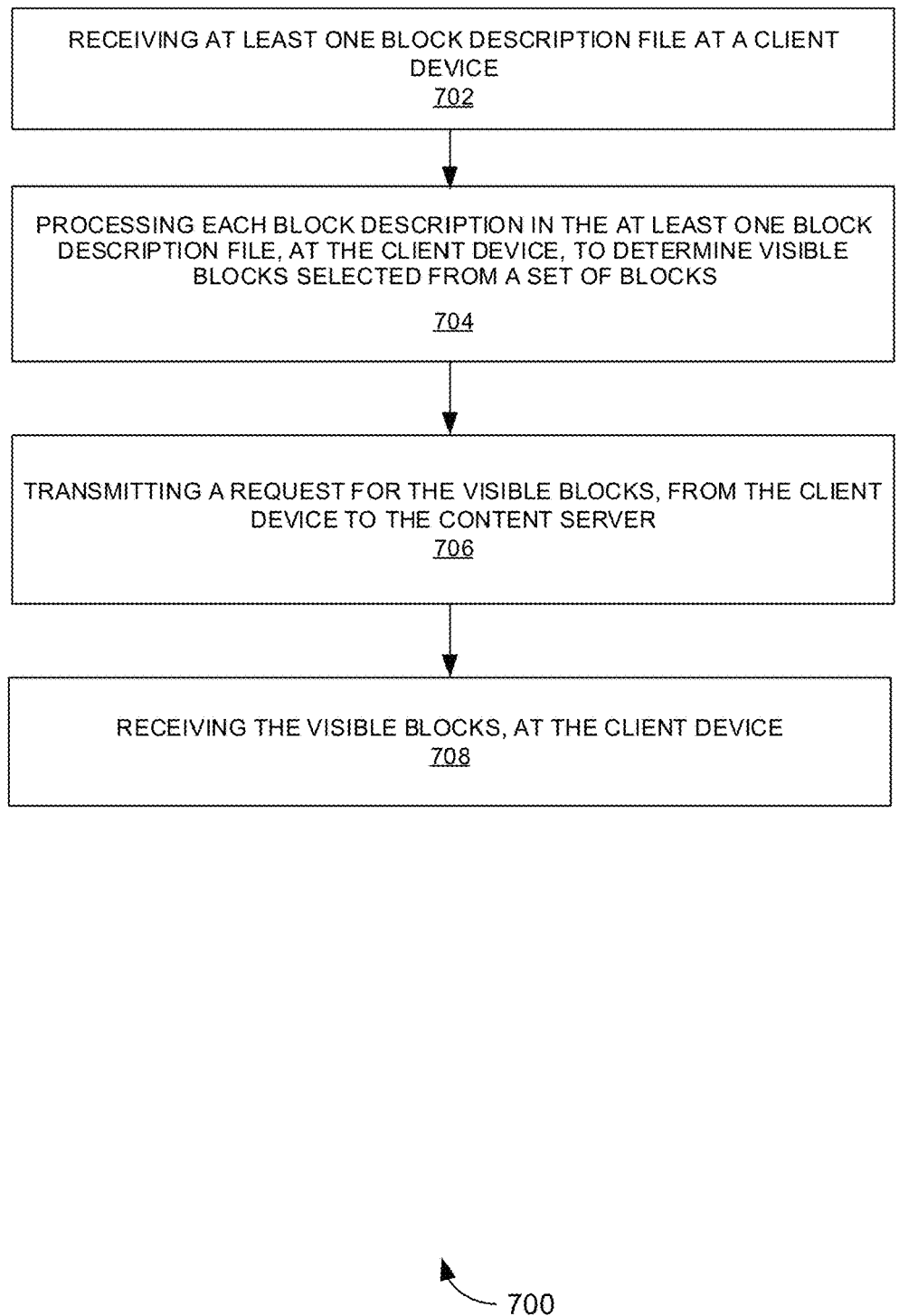
FIG. 7 is a flow chart that illustrates a method for determining and receiving visible blocks videos at the client device of FIG. 1 according to some embodiments herein.

FIG. 7 is a flow chart that illustrates a method 700 for determining and receiving a visible blocks video at the client device 104 of FIG. 1 according to some embodiments herein. At step 702, at least one block description file is received at the client device 104. The at least one block description file includes a set of block descriptions associated with the set of blocks for the predefined time period. The at least one block description file includes at least one resolution and at least one bitrate. For each block in the set of blocks, a block description for each block includes a 3D position, size, and an orientation of each block.

At step 704, each block description in the at least one block description file, is processed at the client device 104, to determine the visible blocks selected from the set of blocks. The visible blocks are a subset of the set of blocks, that are capable of being visible to a viewer of the client device 104 within the predefined time period. The visible blocks are determined based on the 3D position, size, and the orientation of each block in the set of blocks and at least one view parameter of the user 102 of the client device 104. At step 706, a request for the visible blocks, is transmitted from the client device 104 to the content server 110. At step 708, the visible blocks are received as a visible blocks video at the client device 104.

Figure 8:
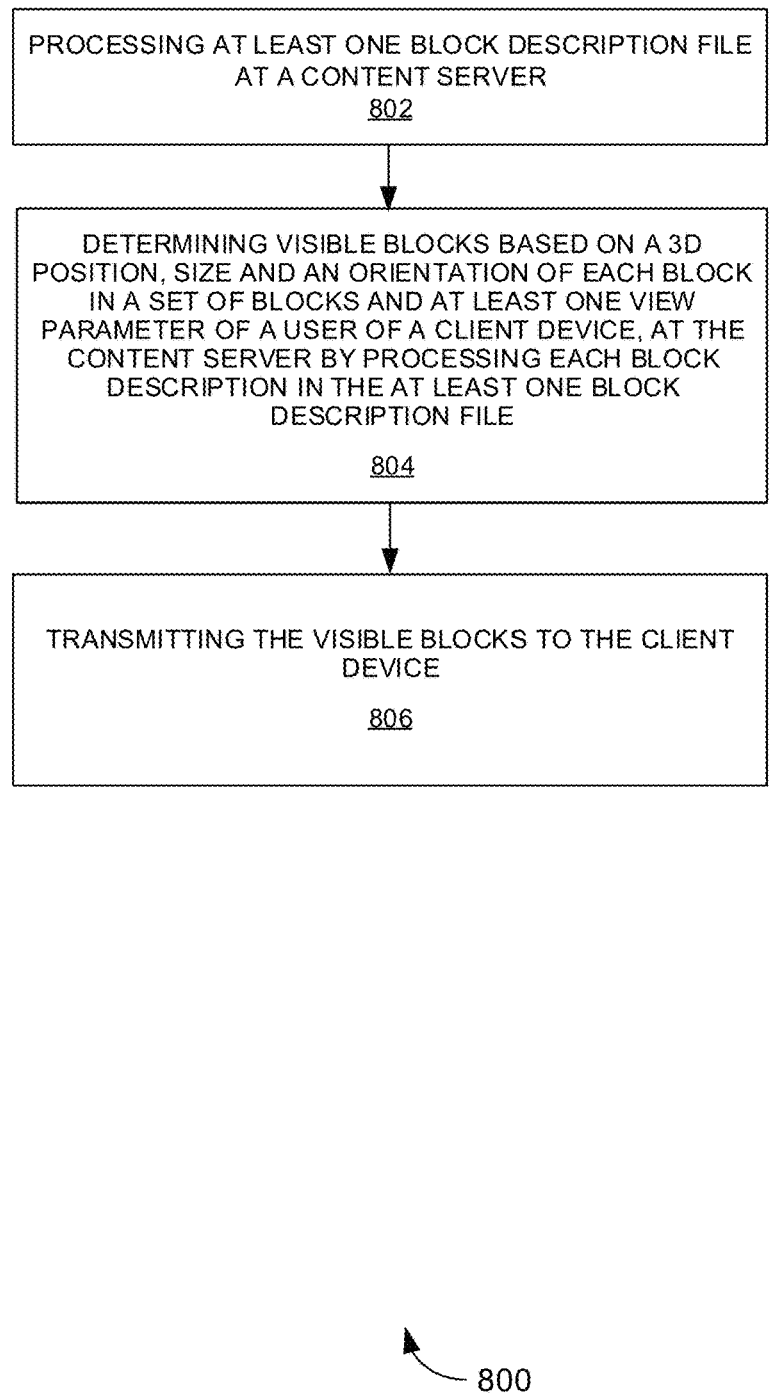
FIG. 8 is a flow chart that illustrates a method for transmitting visible blocks videos from the content server to the client device of FIG. 1 according to some embodiments herein.

FIG. 8 is a flow chart that illustrates a method 800 for transmitting visible blocks videos from the content server 110 to the client device 104 of FIG. 1 according to some embodiments herein. At step 802, the at least one block description file is processed, at the content server 110. The at least one block description file includes a set of block descriptions associated with the set of blocks for the predefined time period. The at least one block description file comprises at least one resolution and at least one bitrate. At step 804, the visible blocks are determined based on a 3D position, size, and an orientation of each block in the set of blocks and at least one view parameter of the user of the client device 104, at the content server 110 by processing each block description in the at least one block description file. For each block in the set of blocks, a block description for each block includes a 3D position, size, and an orientation of each block. The visible blocks are a subset of the set of blocks, that are capable of being visible to the user 102 during the predefined time period. At step 806, the visible blocks are transmitted as a visible blocks video to the client device 104.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
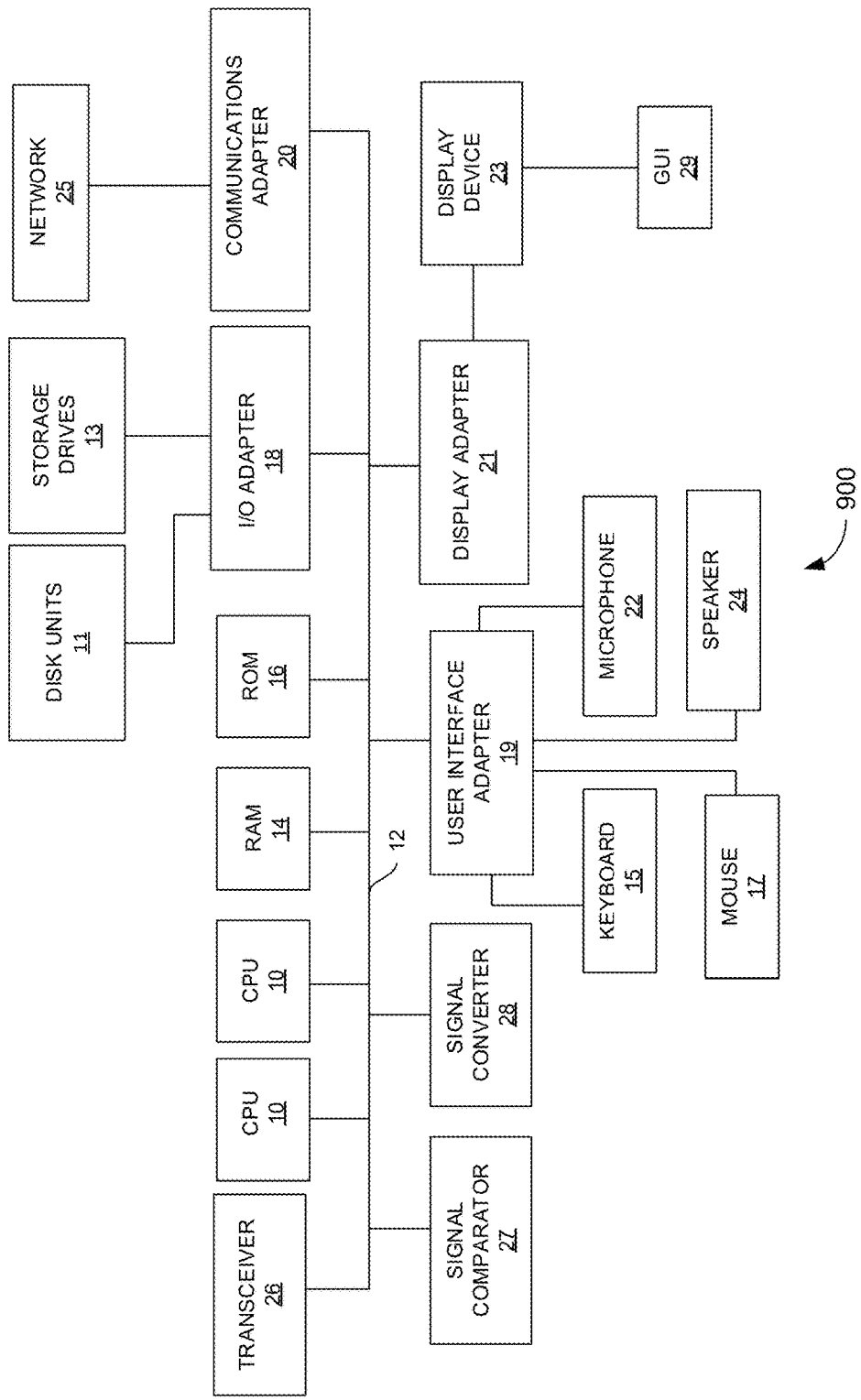
FIG. 9 is a block diagram of a schematic diagram of a device used in accordance with some embodiments herein.

A representative hardware environment for practicing the embodiments herein is depicted in FIG. 9, with reference to FIGS. 1 through 8. This schematic drawing illustrates a hardware configuration of a server/computer system/user device 900 in accordance with the embodiments herein. The user device includes at least one processing device 10. The special-purpose CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The user device can read the inventive instructions on the program storage devices and follow these instructions to execute the methodology of the embodiments herein. The user device further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23, which provides a graphical user interface (GUI) 29 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for streaming a set of visible blocks of volumetric video that correspond to a predefined time period from a content server, the method comprising:

receiving at least one block description file at a client device, wherein the at least one block description file comprises a set of block descriptions associated with the set of blocks for the predefined time period, wherein for each block in the set of blocks, a block description for each block comprises a 3D position, size, and an orientation of each block;

processing each block description in the at least one block description file, at the client device, to determine the visible blocks that are selected from the set of blocks, wherein the visible blocks are a subset of the set of blocks, that are capable of being visible to a viewer of the client device within the predefined time period, wherein the visible blocks are determined based on the 3D position, size, and the orientation of each block in the set of blocks and at least one view parameter of a user of the client device;

transmitting a request for the visible blocks, from the client device to the content server; and receiving the visible blocks as a visible blocks video, at the client device.

2. The processor-implemented method of claim 1, further comprising:

transmitting a request for the at least one block description file, from the client device to the content server.

3. The processor-implemented method of claim 1, wherein the request for the visible blocks video comprises a request for a visible blocks video having a resolution that is within a predefined allowable deviation from a specified resolution that is specified by the client device.

4. The processor-implemented method of claim 1, wherein the at least one block description file comprises at least one resolution and at least one bitrate, wherein the selected visible blocks that are visible to the viewer of the client device are transmitted based on a resolution and a bitrate that is requested by the client device.

5. The processor-implemented method of claim 1, wherein the visible blocks are determined based on the at least one parameter that is selected from (i) a virtual camera position, (ii) a virtual camera orientation, (iii) a virtual camera field of view, (iv) a rate of change of the virtual camera position, (v) the rate of change of the virtual camera orientation, and (vi) the rate of change of the virtual camera field of view of the client device.

6. The processor-implemented method of claim 1, wherein a first number (N) of subsets of the set of blocks of volumetric video is rendered into a first number (N) of visible blocks videos corresponding to a first number (N) of values of the at least one view parameter, wherein the first number (N) of values of the at least one view parameter are predefined by a content creator, and each of the first number (N) of visible blocks videos is rendered with respect to a different value of the at least one view parameter.

7. The processor-implemented method of claim 6, wherein each of the first number (N) of visible blocks videos is downsampled and re-encoded a second number (M) of times at the second number (M) of pairs of resolution and bitrates.

8. The processor-implemented method of claim 1, wherein if the visible blocks are not available as a visible blocks video within a timeout period and if a superset of the visible blocks is available as a visible blocks video at the content server, the superset of the visible blocks is transmitted as a visible blocks video from the content server to the client device.

9. The processor-implemented method of claim 8, wherein the visible blocks are rendered and stored as a visible blocks video in the content server, and the visible blocks video is available to be transmitted in response to a future request.

10. The processor-implemented method of claim 1, wherein the content server stores different versions of each block selected from the set of blocks of volumetric video, wherein each version of each block corresponds to a different view orientation, and the content server determines a selected version of each block that provides a most accurate representation of each block from the view orientation of the viewer of the client device and transmits selected versions of each block from the visible blocks.

11. The processor-implemented method of claim 10, wherein if the volumetric video is generated using a plurality of cameras, the selected version of each block comprises a texture that is obtained from a selected camera that is selected from the plurality of cameras, wherein a camera that has a location and an orientation that corresponds most closely to the view location and an orientation of the viewer of the client device is selected as the selected camera.

12. The processor-implemented method of claim 10, wherein if the volumetric video is generated using a synthetic 3D model with simulated material properties, the selected version of each block that provides a most accurate representation of each block from the view orientation of the viewer of the client device is generated by rendering the synthetic 3D model from the view orientation of the viewer of the client device to obtain a resulting image, and a texture from the resulting image is used as a texture for each block.

13. A processor-implemented method for transmitting a set of blocks of volumetric video from a content server for streaming visible blocks at a client device during a predefined time period, the method comprising:
processing at least one block description file, at the content server, wherein the at least one block description file comprises a set of block descriptions associated with the set of blocks for the predefined time period;
determining the visible blocks based on a 3D position, size, and an orientation of each block in the set of blocks and at least one view parameter of a user of the client device, at the content server, by processing each block description in the at least one block description file, wherein for each block in the set of blocks, a block description for each block comprises a 3D position, size, and an orientation of each block, wherein the visible blocks are a subset of the set of blocks, that are capable of being visible to the user during the predefined time period; and
transmitting the visible blocks to the client device as a visible blocks video.

14. The processor implemented method of claim 13, wherein the transmitted visible blocks video having a resolution that is within a predefined allowable deviation from a specified resolution that is specified by the client device.

15. The processor-implemented method of claim 13, further comprising:
obtaining the orientation of each block in the set of blocks and the at least one view parameter of the user of the client device from the client device.

16. The processor-implemented method of claim 13, further comprising:
obtaining, from the client device, the at least one parameter that is selected from (i) a virtual camera position, (ii) a virtual camera orientation, (iii) a virtual camera field of view, (iv) a rate of change of the virtual camera position, (v) the rate of change of the virtual camera orientation, and (vi) the rate of change of the virtual camera field of view of the client device; and
determining the visible blocks, at the content server, based on the at least one parameter.

17. The processor-implemented method of claim 13, wherein a first number (N) of subsets of the set of blocks of volumetric video is rendered into a first number (N) of visible blocks videos corresponding to a first number (N) of values of the at least one view parameter, wherein the first number (N) of values of the at least one view parameter are predefined by a content creator, and each of the first number (N) of visible blocks videos is rendered with respect to a different value of the at least one view parameter.

18. The processor-implemented method of claim 14, wherein each of the first number (N) of visible blocks videos is downsampled and re-encoded a second number (M) of times at the second number (M) of pairs of resolution and bitrates.

19. The processor-implemented method of claim 17, further comprising:
if the visible blocks video is not available within a timeout period and if a superset of the visible blocks are available as a visible blocks video at the content server, the superset of the visible blocks are transmitted as a visible blocks video from the content server, to the client device.

20. The processor-implemented method of claim 19, further comprising:

rendering and storing the visible blocks video in the content server, wherein the visible blocks video is available to be transmitted in response to a future request.

21. The processor-implemented method of claim 13, wherein the content server stores different versions of each block selected from the set of blocks of volumetric video, wherein each version of each block corresponds to a different view orientation, and the content server determines a selected version of each block that provides a most accurate representation of each block from the view orientation of the viewer of the client device and transmits selected versions of each block from the visible blocks.

22. The processor-implemented method of claim 21, wherein if the volumetric video is generated using a plurality of cameras, the selected version of each block comprises a texture that is obtained from a selected camera that is selected from the plurality of cameras, wherein a camera that has a location and an orientation that corresponds most closely to the view location and an orientation of the viewer of the client device is selected as the selected camera.

23. The processor-implemented method of claim 21, wherein if the volumetric video is generated using a synthetic 3D model with simulated material properties, the selected version of each block that provides a most accurate representation of each block from the view orientation of the viewer of the client device is generated by rendering the synthetic 3D model from the view orientation of the viewer of the client device to obtain a resulting image, and a texture from the resulting image is used as a texture for each block.

24. One or more non-transitory computer readable storage mediums storing one or more sequences of instructions, which when executed by one or more processors, causes a processor-implemented method for streaming a set of visible blocks of volumetric video that correspond to a predefined time period from a content server to a client device, the method comprising:
receiving at least one block description file at the client device, wherein the at least one block description file comprises a set of block descriptions associated with the set of blocks for the predefined time period, wherein for each block in the set of blocks, a block description for each block comprises a 3D position, size, and an orientation of each block;
processing each block description in the at least one block description file, at the client device, to determine the visible blocks that are selected from the set of blocks, wherein the visible blocks are a subset of the set of blocks, that are capable of being visible to a viewer of the client device during the predefined time period, wherein the visible blocks are determined based on the 3D position, size, and the orientation of each block in the set of blocks and view parameters of a user of the client device;
transmitting a request for the visible blocks, from the client device to the content server; and
receiving the visible blocks as a visible blocks video, at the client device.

* * * * *